United States Patent [19]

Erickson

[11] 4,253,524

[45] Mar. 3, 1981

[54] HIGH FLOW CHECK VALVE APPARATUS

[75] Inventor: John W. Erickson, Huntington Beach, Calif.

[73] Assignee: Kobe, Inc., City of Commerce, Calif.

[21] Appl. No.: 50,921

[22] Filed: Jun. 21, 1979

[51] Int. Cl.³ ............... E21B 34/08; F16K 15/04
[52] U.S. Cl. ................. 166/325; 137/512.1; 137/533.11
[58] Field of Search ........... 137/512.1, 539, 599, 137/533.11; 166/325, 327, 328, 105

[56] References Cited

U.S. PATENT DOCUMENTS

| 980,050 | 12/1910 | Black | 137/512.1 |
|---|---|---|---|
| 1,173,157 | 2/1916 | Allen | 137/512.1 |
| 1,613,145 | 1/1927 | Trump | 137/512.1 |
| 2,308,876 | 1/1943 | Hammett | 137/512.1 |
| 2,367,893 | 1/1945 | Sheen | 137/512.1 X |
| 2,944,794 | 7/1960 | Myers | 166/325 X |

Primary Examiner—William R. Cline

Attorney, Agent, or Firm—William C. Norvell, Jr.

[57] ABSTRACT

A check valve apparatus is provided for high volume fluid conduits such as a casing string of an oil well. In order to maximize the fluid delivered from the well, it is essential that the restrictions imposed on the fluid flow path by necessary components in the casing string, such as a standing check valve, provide as little as possible interference with the flow area. This invention provides a valving arrangement including longitudinally extending, separated, parallel fluid inlet and outlet passages interconnected by a plurality of ball valve chambers, with each chamber defining a transverse ball seat and containing a ball cooperating with such seat. The fluid area of the inlet passage decreases from the first chamber to the last in the direction of fluid flow while the fluid area of the outlet passage increases from the first chamber to the last, so that the total fluid area passage through the plurality of valves in their open position is maximized.

1 Claim, 4 Drawing Figures

HIGH FLOW CHECK VALVE APPARATUS

BACKGROUND OF THE INVENTION

1. Field of the Invention

This invention relates to a check valve apparatus, and particularly to standing check valve for use in oil wells.

2. Description of the Prior Art

The world's energy demands have placed an increasing emphasis on maximizing the amount of oil pumped from each producing well. Obviously, the volume of oil to be pumped from a well is first limited by the interior diameter of the well casing or other conduit. A secondary limitation on the maximum fluid flow from the casing is the necessity of incorporating protective apparatus in the casing, such as a standing check valve which is normally disposed in the bottom portion of the casing beneath the pumping apparatus to permit the pumping apparatus to be removed or shut off without losing the column of oil previously pumped and existing in the casing. A ball valve has been preferred for such check valving apparatus inasmuch as it is extremely reliable and is not apt to hang up in the opening position or fail to achieve a proper seal in its closed position. However, the conventional ball valve does provide a substantial impairment to fluid flow in its open position and there is a need therefore for a check valving apparatus having the reliability of a ball valve, but yet providing substantially increased fluid flow area in the open position of the valve apparatus.

SUMMARY OF THE INVENTION

In essence, this invention contemplates providing a plurality of check valves within an oil well casing but arranging the fluid inlet and outlet passages to the respective chambers containing the ball valves in such fashion that the area available for fluid flow through the valves in their open position is maximized. This is accomplished by providing parallel, axially extending separated inlet and outlet fluid passages in a tubular housing and interconnecting such passages by a plurality of ball valve chambers, each of the chambers defining a ball seat and having a ball disposed therein cooperating with the seat. The inlet passage has as large as possible fluid passage area entering the first ball valve and a decreasing fluid passage area entering each of the successive ball valves. Conversely, the outlet passage has a relatively small fluid passage area communicating with the first of the ball valves but increases in area as it communicates with each successive ball valve chamber so as to maximize the fluid flow through the check valve apparatus when the ball valves are in their open position.

Accordingly, it is an object of this invention to provide an improved check valve apparatus providing a maximum fluid flow through the valve when the valve apparatus is in its open position.

A particular object of this invention is to provide a maximum flow check valve apparatus in the form of a tubular housing which is sealingly mountable within an oil well casing or other conduit and provides an optimum fluid flow through the check valve when the valve is in its open position.

Further objects and advantages of this invention will be apparent to those skilled in the art from the following detailed description.

DESCRIPTION OF THE PREFERRED EMBODIMENTS

Figure 1:
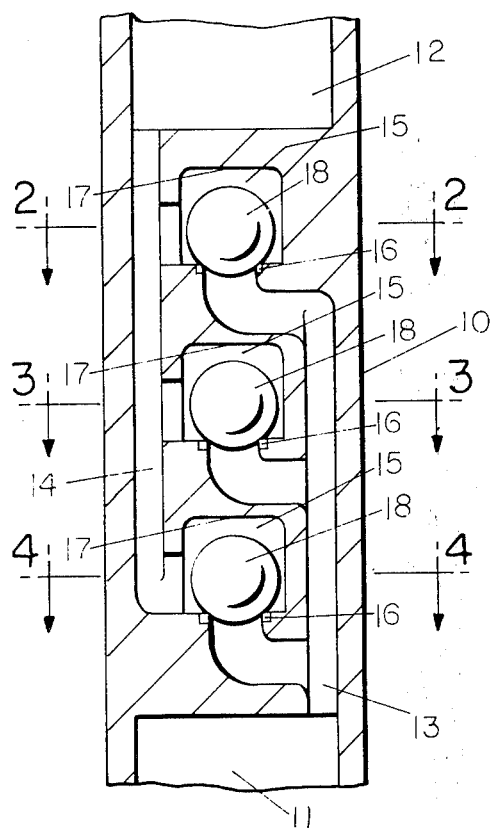
FIG. 1 is a schematic, vertical sectional view of a standing valve for an oil well constructed in accordance with this invention.

Referring to FIG. 1, numeral 10 indicates the outer housing of a standing valve assembly which is conventionally mounted in the lower end portions of the production casing of an oil well, generally immediately below the pumping apparatus. While the construction shown in FIG. 1 indicates that the entire valve housing is fabricated from a unitary piece of metal, those skilled in the art will recognize that this is merely a schematic presentation of the valving apparatus, and that various components of the housing will be separately fabricated and then assembled by brazing or axial stacking to provide the unitary structure shown.

Figure 2:
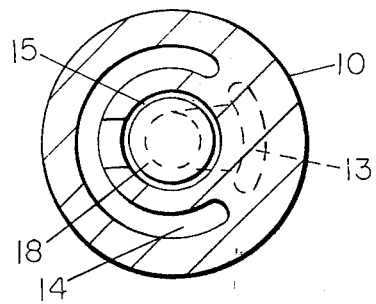
FIG. 2 is a sectional view of the valve taken along the line 2—2 of FIG. 1.
Figure 3:
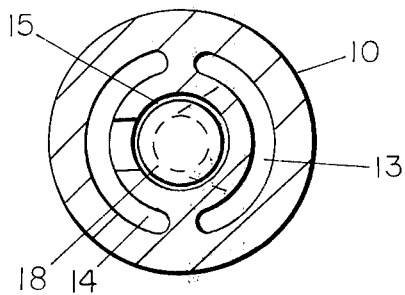
FIG. 3 is a sectional view of the valve taken along the line 3—3 of FIG. 1.
Figure 4:
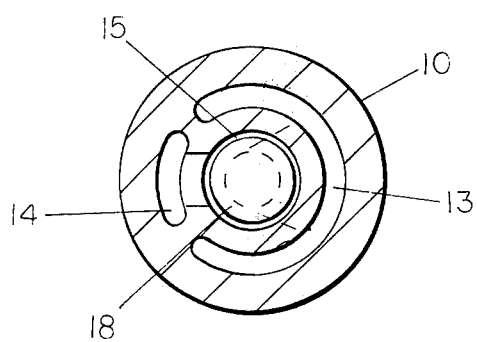
FIG. 4 is a sectional view of the valve taken along the line 4—4 of FIG. 1.

The housing 10 has a large inlet passage 11 at its bottom end and an equally large outlet passage 12 at its top end. Extending upwardly from the inlet passage 11 is a continuation inlet passage 13 which is of semi-annular cross-sectional configuration, as best shown in FIGS. 2 through 4, and gradually decreases in cross-section as it extends upwardly. On the opposite side of the housing 10, a continuation outlet passage 14 is provided which extends downwardly from the outlet passage 14, and is of semi-annular configuration, as best shown in FIGS. 2 through 4 and this passage decreases in cross-section as it extends downwardly. Continuation inlet passage 13 and outlet passage 14 are entirely separate and are interconnected only by a plurality of axially spaced valve chambers 15. Each chamber 15 includes an annular ball seat 16 and an inverted cup shaped ball enclosure wall 17 which prevents the ball 18 from moving sufficiently far from its seat that it will not readily reseat upon a reversal of flow through the ball valve chamber 15.

While the embodiment specifically illustrated in the drawings employs three such ball valve units, the number of valve units is a function of the desired total fluid passage area available in the standing valve apparatus when all the balls are in an open position. When the balls 18 are in an open position, due to the fluid pressure in the inlet passage 11 being in excess of that existing in the outlet passage 12, the total fluid passage area through the apparatus is primarily measured by the largest area portion of the inlet continuation passage 13 plus the smallest fluid passage area of the outlet continuation passage 14, i.e., the total areas of passages 13 and 14 as shown in cross-section in FIGS. 2-4. This total fluid area remains constant, irrespective of the number of valves incorporated in the apparatus, due to the fact that the area of the continuation inlet passage is decreasing at the same rate that the area of the continuation outlet passage is increasing.

While ball type valves are preferred, poppet type check valves could be utilized.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In an oil well pumping apparatus for pumping oil at a high volume rate from a subterranean well, the improvement comprising: a check valve apparatus mounted in the casing below the pump, said apparatus comprising a tubular housing sealingly mounted in said casing, said housing defining an axially extending inlet passage communicating with the interior of the casing below the check valve apparatus and a separate axially extending outlet passage communicating with the pump inlet, said passages being axially overlapped and the overlapped portions respectively constituting annular segments, a plurality of axially spaced ball valve chambers interconnecting the overlapped portions of said inlet and outlet passages, each said chamber including a transversely disposed circular ball seat, and a ball element disposed in each said chamber and cooperating with said ball seat to prevent reverse flow from said outlet passage to said inlet passage, said inlet and outlet passages each having a fluid flow area greater than a fluid flow area of any one of said valve chambers, the fluid flow area of said inlet passage annular segment decreasing from a first valve chamber to each succeeding valve chamber and the fluid flow area of said outlet passage annular segment increasing from first valve chamber to each succeeding valve chamber.

* * * * *